W. Lancaster,
Washing Machine.
No. 13,222.  Patented July 10, 1855.
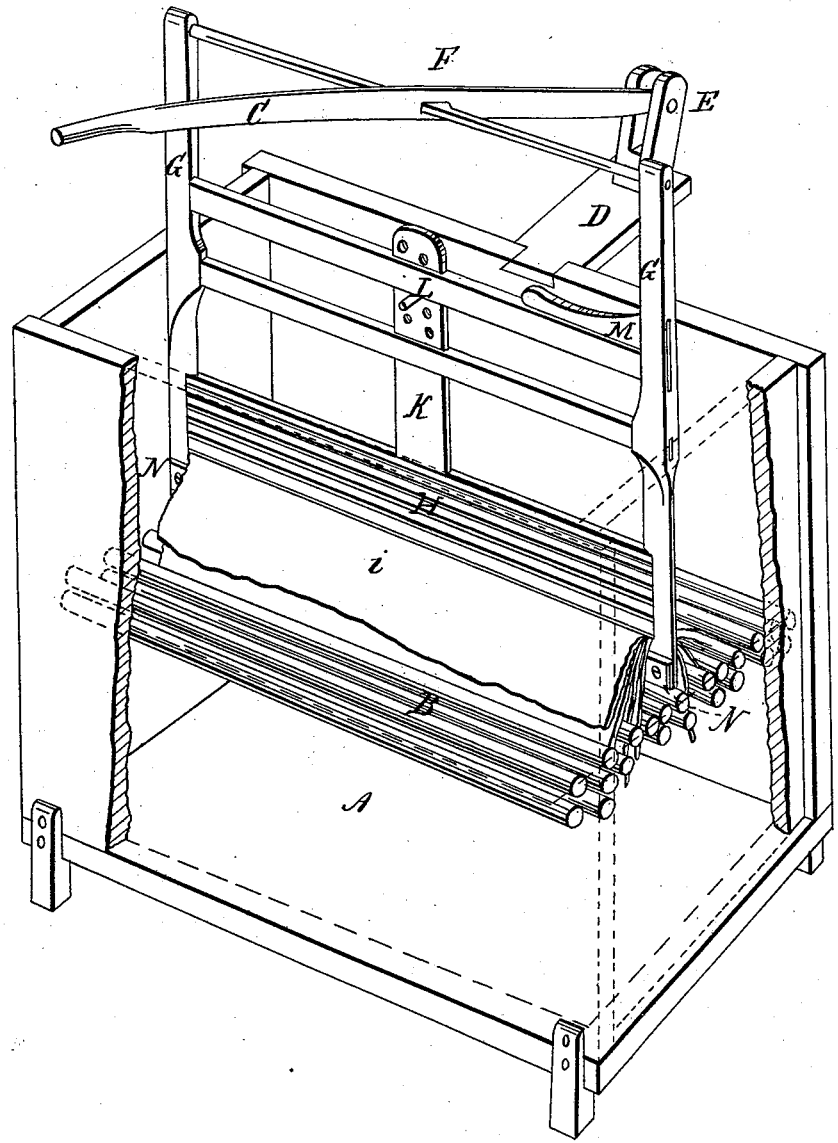
Witnesses;
H. McManus
J. Ferguson
Inventor;
Wright Lancaster

UNITED STATES PATENT OFFICE.

WRIGHT LANCASTER, OF HARMONY TOWNSHIP, UNION COUNTY, INDIANA.

WASHING-MACHINE.

Specification of Letters Patent No. 13,222, dated July 10, 1855.

*To all whom it may concern:*

Be it known that I, WRIGHT LANCASTER, of Harmony township, in the county of Union and State of Indiana, have invented a new and useful Improvement in Washing-Machines by the Use of Wedge-Shaped Fluted Gates and Floating Rods for Washing Clothes; and I do hereby declare that the following is a full, clear, and exact description of the construction and operation of the same, reference being had to the annexed drawings, marked A, making a part of this specification, in which—

(A) represents the box in perspective, which may be constructed of different sizes; the most convenient size for clothing is about 18 inches long, 10 inches wide, and 20 inches in depth.

(B) represents the floating rods, which may be either round or octagonal, and from $1\frac{1}{4}$ to $1\frac{1}{2}$ inches in diameter; numbering from 30 to 40 in each machine, the length just sufficient to permit them to float freely when the box is properly filled with water, which should always be within 3 or 4 inches of the top of the box when washing.

(C) represents the lever which should be from $3\frac{1}{2}$ to 4 feet long; (D,) an oblique upright on the back of the box; (E,) the fulcrum of the lever; (F,) the point where the gate (G, G,) is attached to the lever. The gate (G, G,) should be just wide enough to work smoothly inside of the box.

(H) represents the wedged shaped, fluted, movable piece at the lower part of the gate to aid in washing, and secure the clothing (i) in the gate for washing; and is regulated by the upright piece (K) passing through the bars (L) and secured when the clothes are in by the wedge (M) forcing down the wedge shaped fluted bar on the clothing between it and an oval shaped bar (N, N,) $2\frac{1}{2}$ inches in width at the lower extremity of the gate.

The wedged shaped fluted piece (H) should be 5 inches in width, $1\frac{1}{4}$ inches thick, and $\frac{1}{4}$ inch at bottom fluted on both sides, so that, when the box is sufficiently filled with water, as above directed and the clothes secured between H and N, N, in the lower end of the gate they may be moved up and down by means of the lever (C) between the rods (B) producing the largest amount of friction possible without damage to the clothing.

The part of the above machine for which I desire to secure Letters Patent, and which I claim as my original invention is—

The floating rods marked (B) which are claimed to be an improvement on any former machine for their freedom of action, their adaptation to the washing and cleansing of clothes by friction without damage to the finest fabric, and the facility and speed with which, (this, otherwise laborious process is performed) by the use and application of this improvement. And to all other parts of the above described machine I hereby disclaim all and any right to Letters Patent, and confine my claim especially to the aforesaid improvement, (B) by the use of floating rods.

WRIGHT LANCASTER.

Subscribed in presence of—
J. N. McMANUS,
L. FERGUSON.